Oct. 19, 1948.  C. F. WALLACE  2,451,789
VIBRATORY ARMATURE ELECTROMAGNETIC MOTOR
Filed Aug. 3, 1945
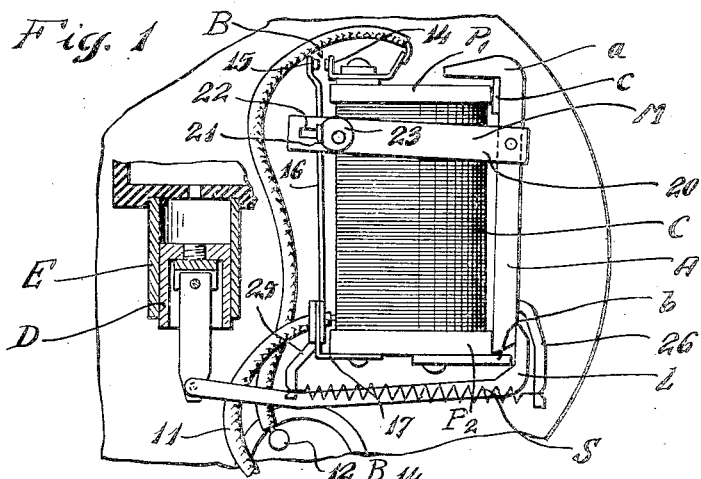
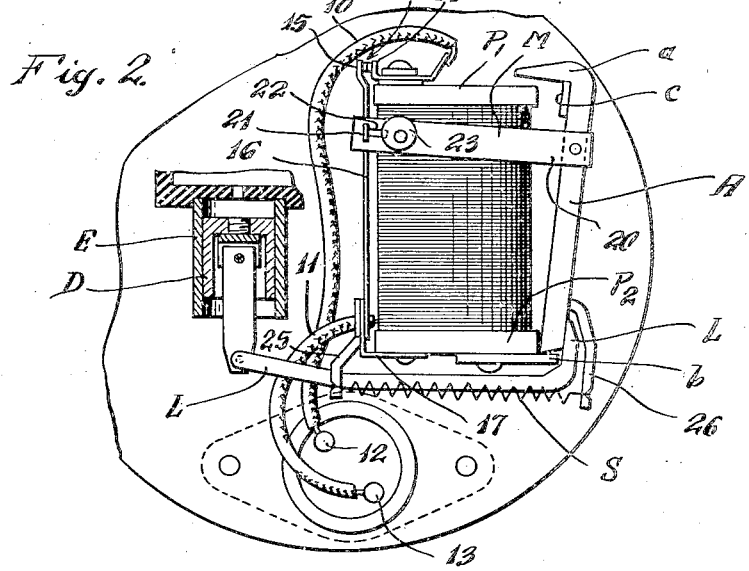
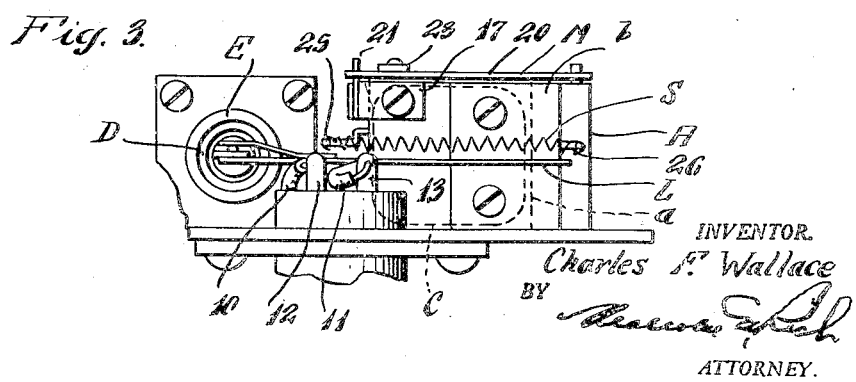
INVENTOR.
Charles F. Wallace
BY
ATTORNEY.

Patented Oct. 19, 1948

2,451,789

UNITED STATES PATENT OFFICE 2,451,789

VIBRATORY ARMATURE ELECTRO-MAGNETIC MOTOR

Charles F. Wallace, Westfield, N. J., assignor to Wallace & Tiernan Products, Inc., Belleville, N. J., a corporation of New Jersey Application August 3, 1945, Serial No. 608,700

7 Claims. (Cl. 172—126)

This invention relates to electromagnetic motors having a vibrating armature and aims to provide a direct current vibrating armature motor provided with means translating the vibratory motion of the armature into a reciprocating work motion for application to the actuation of mechanisms. More particularly the invention aims to provide a vibrating armature electromagnetic motor energized by direct current wherein the power of the vibrating motion of the armature may be utilized in the actuation of reciprocating mechanisms such as a reciprocating pump.

Another aim and object is to provide an improved electromagnetic motor means providing a reciprocating work motion for the energization of mechanisms which are adapted to be driven by this type of work motion.

A further object is to provide, in a vibrating armature electromagnetic motor, a means translating the vibrating motion of the armature into a reciprocating work motion adapted to actuate, directly or indirectly, various types of mechanisms.

Other objects will be apparent as the invention is more fully hereinafter disclosed.

This application is a continuation-in-part application of my application Serial No. 517,180 filed January 6, 1944, which is assigned to the same assignee as the present application.

In accordance with these objects, I have devised the vibrating armature direct current electromagnetic motor, one specific embodiment of which is illustrated in the accompanying drawings, in which means is provided to vibrate the armature into and out of pole piece bridging position about a pivot point at one end of the armature, and means also is provided to translate the vibrating or pivotal movement of the armature into a reciprocating work motion for application to the actuation of a mechanism which, in the specific example shown, comprises a reciprocating pump. The pump means actuated by the motor means of the present invention is one of the elements of the combination of elements described and claimed in my co-pending application, above identified, as is also the motor means of the present invention.

Before further disclosure of the present invention reference should be made to the accompanying drawings, wherein:

Fig. 1 is a side view of the motor means of the present invention shown in operative relation to a reciprocating pump means in one position of reciprocating operation;

Fig. 2 is a similar view showing the motor and pump means in the opposite position of reciprocating operation; and Fig. 3 is an end view of the said motor means.

Referring to the drawings, the electromagnetic motor means of the present invention consists essentially of an electromagnetic coil C wound about an iron core (not shown) on the opposite ends of which core are formed or attached pole pieces $P_1$ and $P_2$. An armature A is provided which is pivoted at one end $b$ on one of the pole pieces ($P_2$) and is provided at the opposite end with an extension $a$ overlying the top of the opposite pole piece ($P_1$) in such manner as to provide a relatively small air gap between the pole piece $P_1$ and the armature extension $a$ over the relatively large pivotal angle of movement of the armature. The armature A also is provided with a bumper $c$ made from a non-ferrous metal or from resilient material such as cork or rubber located in a position to engage with the end of pole piece $P_1$ when the armature A is pivotally moved to the pole piece engaging position of Fig. 1.

Pivotal vibration of armature A is obtained by means of a make and break contact B in the coil energizing current which contact is operated by mechanical means M actuated by armature A. The make and break contact B is electrically connected in series with the coil C in the direct current electrical circuit for energizing the coil C. Means M is arranged to break the contact B and the coil energizing circuit when the armature A is moved a predetermined distance towards its closed position (as shown in Fig. 1) and to close the contact B and the coil energizing circuit when the armature A, under the urging of tension means S, is moved back a predetermined distance to the open position shown in Fig. 2. Various alternative arrangements to accomplish substantially the same results may be utilized without essential departure from the present invention. The arrangement shown, however, is compact, simple and highly efficient.

As may be noted from the drawings, lead wires 10—11 are provided to conduct the direct current for energizing coil C from terminals 12—13 to coil C. Lead wire 10 conducts the current to one side of contact B and thence through the contact points 14 and 15 and auxiliary armature or rod 16 and the pole piece $P_2$ and core to one end of coil C. Lead wire 11 conducts the current from the opposite end of coil C.

Make and break contact B consists of a fixed contact point 14 mounted on but insulated from pole piece P₁ and a movable contact point 15 mounted on flat rod 16 comprised of electrically conductive and magnetizable material sustained by angle plate 17 comprised of spring metal which is secured to pole piece P₂. Angle plate 17 is arranged to sustain rod 16 in a position normally holding contact point 15 out of closure position with contact 14. Means M is provided to move contact 15 into closing position with contact 14 against the spring action of angle plate 17 and to move contact 15 to open position against the magnetizing action of pole piece P₁ on rod 16.

Means M consists of a bar 20 extending between armature A and rod 16, the bar being pivotally conected to the armature A and having an adjustable lost motion connection with the rod 16. The lost motion connection consists of a T-lug 21 on rod 16 which extends through a slot 22 in the end of bar 20. A small disc 23 eccentrically pivoted on bar 20 adjacent the inner end of slot 22 provides means to vary the length of the slot and thereby to vary the point in the inward movement of the armature at which the magnetic current is broken. During the first part of the inward movement of armature A from the position of Fig. 2 to the position of Fig. 1, as a result of the magnetic forces induced in the core and pole pieces P₁ and P₂ by the closing of contact B obtained by the action of spring means S, the rod 16 is held by the magnetic forces in contact closing position, the spring action of angle plate 17 being insufficient to overcome the magnetic forces. When the inner end of slot 22 engages stud or lug 21 the rod 16 is moved outwardly to a position separating contacts 14 and 15, thereby breaking the magnetic circuit, deenergizing coil C and releasing pivoted armature A for return to open position by the action of spring S.

As the armature A is moved to open position, bar 20 is moved therewith releasing lug 21 from contact with the inner end of slot 22 but angle support 17 holds rod 16 in a position maintaining a space gap between contact points 15 and 14 until the outer end of slot 22 engages the opposite side of lug 21 to move the rod 16 over to a position bringing contact points 15 and 14 into engagement. This completes the circuit for the magnetizing current and rod 16 is again held in contact engaging position and armature A is again pivotally moved towards pole piece P₁ by the magnetic forces against the spring action of spring S.

Various alternative spring actions may be employed in place of the spring means S without essential departure from the present invention. The arrangement shown, however, is compact, simple and effective to obtain the result desired. In this arrangement, one end of the spring S is attached to the armature A by extension 26 at a point intermediate the free and pivoted ends of the armature and the other end of spring S is attached to a fixed extension 25.

The means provided for translating the vibrational or pivotal movement of armature A into a reciprocating work motion may be varied widely without essential departure from the present invention. In the specific embodiment of the present invention illustrated in the drawings, the application of this reciprocating work motion to the reciprocation of a pump piston D within the cylinder of a reciprocating pump E is desired. The reciprocating work motion desired is relatively small and the amount of power required is relatively small, as pump E is an air pump utilizing relatively small air pressures on a pressure differential basis.

To effect the reciprocation of piston D of pump means E, the pump cylinder is mounted in axial alignment with the axis of armature A and a lever arm extension L is provided on armature A lying generally in a plane parallel to the plane of the aligned axes of pump E and armature A. The free end of the lever arm L is pivotally connected directly to the piston D in such manner as to reciprocate the piston with reciprocation of lever arm L upon vibrational movement of armature A. Various mechanical movements may be employed intermediate lever arm L and piston D, if desired, without departing from the invention. With this arrangement, however, the power required for the compression stroke of the piston D may be supplied by spring S, which is desirable, to eliminate variations in pump pressure which would otherwise result from voltage variations in case the magnetic pull of the armature directly actuated the compression stroke of the pump. A reverse application of the two powers, directly or indirectly, in the operation of piston D, however, may be made without essential departure from the present invention.

Various other alternative arrangements will occur to those skilled in the art from the above disclosure and from the specific embodiment of the present invention illustrated in the drawings and all such modifications and adaptations of, and departures from, the present invention are contemplated as may fall within the scope of the following claims.

What I claim is:

1. An electromagnetic motor, comprising an electromagnet and a spring-retracted pivoted armature; and having means for controlling the magnet circuit comprising a fixed contact, a movable contact, an auxiliary armature which tends to hold the movable contact against the fixed contact when the magnet is energized and which is under tension to move the movable contact away from the fixed contact, and a connecting member extending between the main armature and the auxiliary armature pivotally connected to one and having a lost motion connection to the other, whereby the auxiliary armature is moved to break the circuit as the main armature nears the end of its movement toward the magnet and is moved to close the circuit as the main armature nears the end of its outward movement.

2. An electromagnetic motor, comprising an electromagnet and a pivoted armature; and having means for controlling the magnet circuit comprising a fixed contact, a movable contact, a flat rod of magnetic material by which the movable contact is carried and which extends close to one pole piece of the magnet and is electrically connected to the other pole piece of the magnet by a thin plate of spring metal which applies a force tending to move the movable contact away from the fixed contact, and a bar extending between the armature and said rod pivotally connected to one and having a lost motion connection with the other, whereby said rod is moved to break the circuit as the armature nears the end of its movement toward the magnet and is moved to close the circuit as the armature nears the end of its outward movement.

3. An electromagnetic motor comprising an electromagnet and a spring-retracted pivoted armature and having means for controlling energization of the magnet circuit comprising a fixed contact and a movable contact electrically connected in series with the magnetizing coil of the electromagnet; an auxiliary armature carrying the movable contact and arranged to hold the movable contact against the fixed contact against a spring tension when the magnet coil is energized and to move the movable contact away from the fixed contact by said spring tension when the magnet coil is de-energized, and a connecting member extending between the pivoted armature and the auxiliary armature, said connecting member being pivotally connected to one armature and having a lost motion connection to the other armature, whereby the auxiliary armature is moved to break the circuit as the pivoted armature reaches the end of its magnetic force urged movement toward the magnet and is moved to close the circuit as the pivoted armature reaches the end of its spring urged movement away from the magnet.

4. An electromagnetic motor comprising an electromagnet and a pivoted armature and having means for controlling the magnet circuit comprising a fixed contact, a movable contact, and a flat rod of magnetic material by which the movable contact is carried and which extends close to one pole piece of the magnet by a thin plate of spring metal which applies a force tending to move the movable contact away from the fixed contact, and a bar extending between the armature and said rod pivotally connected to one and having a lost motion connection with the other, said lost motion connection comprising a slot in the unpivoted end of said bar, a lug on the other said armature engaging in said slot, and means to adjust the length of said slot to regulate the engagement of the lug with the slot ends.

5. In an electromagnetic motor including a magnetizing coil having pole pieces, a spring-retracted pivoted armature, a make and break contact having a movable contact point and a stationary contact point in the magnetizing coil circuit for controlling the energization of said coil and means operating periodically to open and close the said contact to pivotally actuate the said armature into and out of pole piece bridging position, the improvement which comprises an auxiliary armature carrying the movable contact point, said armature being sustained at one end electrically in contact with one pole piece and being provided with a spring means retracting the opposite end out of pole piece engaging position, a bar connecting the pivoted armature and the auxiliary armature, said bar being pivotally connected to one and being connected to the other by an adjustable lost motion connection providing movement of the auxiliary armature and movable contact thereon out of circuit closing position when the pivoted armature reaches pole piece bridging position and into circuit closing position when the pivoted armature is spring-retracted a determined distance out of pole piece bridging position.

6. The improvement of claim 5, said adjustable lost motion connection comprising a slot in the unpivoted end of the bar, a lug extension on the said other armature engaging in said slot, and means varying the length of said slot.

7. The improvement of claim 5, said adjustable lost motion connection comprising a slot in the unpivoted end of the bar, a lug extension on the said other armature engaging in said slot, and a circular disc eccentrically mounted adjacent one end of said slot to be rotated into partial closure position over the end of said slot.

CHARLES F. WALLACE.

REFERENCES CITED

The following references are of record in the file of this patent:

UNITED STATES PATENTS

| Number | Name | Date |
| --- | --- | --- |
| 783,102 | Casper | Feb. 21, 1905 |
| 1,567,053 | Hibbard | Dec. 29, 1925 |
| 2,362,690 | Fichter et al. | Nov. 19, 1944 |